US012021363B2

(12) United States Patent
Burghard et al.

(10) Patent No.: US 12,021,363 B2
(45) Date of Patent: Jun. 25, 2024

(54) ELECTRICAL FEEDTHROUGH FOR A PRESSURE HOUSING

(71) Applicant: Innomotics GmbH, Nuremberg (DE)

(72) Inventors: Matthias Johannes Burghard, Berlin (DE); Marco Festa, Falkensee (DE); Peter Vogeley, Falkensee (DE); Johannes Hardeweg, Berlin (DE)

(73) Assignee: Innomotics GmbH, Nuremberg (DE)

( * ) Notice: Subject to any disclaimer, the term of this patent is extended or adjusted under 35 U.S.C. 154(b) by 386 days.

(21) Appl. No.: 17/432,409

(22) PCT Filed: Dec. 19, 2019

(86) PCT No.: PCT/EP2019/086251
§ 371 (c)(1),
(2) Date: Aug. 19, 2021

(87) PCT Pub. No.: WO2020/169232
PCT Pub. Date: Aug. 27, 2020

(65) Prior Publication Data
US 2022/0200256 A1    Jun. 23, 2022

(30) Foreign Application Priority Data
Feb. 21, 2019  (EP) .................................... 19158570

(51) Int. Cl.
*H02G 3/22*    (2006.01)
*E04G 15/06*   (2006.01)
*H01R 13/53*   (2006.01)

(52) U.S. Cl.
CPC ............... *H02G 3/22* (2013.01); *H01R 13/53* (2013.01); *E04G 15/061* (2013.01)

(58) Field of Classification Search
CPC ......... H02G 3/22; H01R 13/53; E04G 15/061
See application file for complete search history.

(56) References Cited

U.S. PATENT DOCUMENTS 4,041,240 A * 8/1977 Sipowicz ............... H01B 17/30
                                                    439/736
4,237,336 A * 12/1980 Kostjukov ............... H02G 3/22
                                                    174/18

(Continued)

FOREIGN PATENT DOCUMENTS

DE          295431  A5   10/1991
DE         4312617  A1   10/1994

(Continued)

OTHER PUBLICATIONS

English Translation of International Preliminary Report on Patentability Chapter II for PCT/EP2019/086251 (7 pages). (Year: 2021).*

(Continued)

*Primary Examiner* — Rodney Mintz
(74) *Attorney, Agent, or Firm* — Henry M. Feiereisen LLC (57) ABSTRACT

An electrical feedthrough for a pressure housing includes two feedthrough elements having substantially matching external shape and dimension. Each feedthrough element extends straight along an element axis between a first element end portion and a second element end portion. A connecting element is releasably connected to the feedthrough elements and has opposite sides, with one of the opposite sides having a contact area upon which the first element end portion of one of the feedthrough elements abuts, and with the other one of the opposite sides having a contact area upon which the first element end portion of the other one of the feedthrough elements abuts. At least one of the feedthrough elements includes an electrical feedthrough conductor which extends along the element axis of the feedthrough element and abuts a connecting conductor of the connecting element.

14 Claims, 4 Drawing Sheets

(56) References Cited

U.S. PATENT DOCUMENTS

| | | | |
|---|---|---|---|
| 7,193,153 B2* | 3/2007 | Hemingway | H01H 13/04 |
| | | | 174/64 |
| 7,281,949 B2* | 10/2007 | Tenyakov | H01B 17/305 |
| | | | 439/587 |
| 9,553,398 B2* | 1/2017 | True | H02G 3/22 |
| 9,774,131 B2* | 9/2017 | Painter | H01R 13/523 |
| 10,143,868 B2* | 12/2018 | Lopes | F16L 5/04 |
| 10,937,556 B2* | 3/2021 | Mustafin | G21C 13/04 |
| 2006/0000630 A1* | 1/2006 | Hemingway | A62C 3/16 |
| | | | 174/58 |
| 2006/0060369 A1* | 3/2006 | Hemingway | A62C 3/16 |
| | | | 174/58 |
| 2007/0066109 A1* | 3/2007 | Tenyakov | H01B 17/305 |
| | | | 439/198 |
| 2016/0359261 A1* | 12/2016 | True | H01R 13/5219 |
| 2017/0062081 A1* | 3/2017 | Mustafin | H02G 3/22 |
| 2017/0179635 A1* | 6/2017 | Painter | H01R 13/41 |
| 2017/0354836 A1* | 12/2017 | Lopes | H02G 3/22 |

FOREIGN PATENT DOCUMENTS

| | | |
|---|---|---|
| EP | 1720177 A1 | 11/2006 |
| FR | 1497598 A | 10/1967 |
| JP | 2007097332 A | 4/2007 |
| KR | 20090014901 A | 2/2009 |
| SU | 1588187 A2 | 10/1991 |
| WO | WO 2008155881 A1 | 12/2008 |

OTHER PUBLICATIONS

PCT International Examination Report and Written Opinion of International Examination Authority dated Feb. 20, 2020 corresponding to PCT International Application No. PCT/EP2019/086251 filed Dec. 19, 2019.

\* cited by examiner

ELECTRICAL FEEDTHROUGH FOR A PRESSURE HOUSING

CROSS-REFERENCES TO RELATED APPLICATIONS

This application is the U.S. National Stage of international Application No. PCT/EP2019/086251, filed Dec. 19, 2019, which designated the United States and has been published as International Publication No. WO 2020/169238 A1 and which claims the priority of European Patent Application, Serial No. 19158570.2, filed Feb. 21, 2019, pursuant to 35 U.S.C. 119(a)-(d).

BACKGROUND OF THE INVENTION

The invention relates to an electrical feedthrough for a pressure housing, a machine arrangement with an electric machine arranged in a pressure housing and a method for producing a machine arrangement of this type.

In order to supply an electric machine arranged in a housing having an energy source arranged outside the housing with electrical energy, an electrical feedthrough through the housing is needed. Such a feedthrough is designed for the conducting of the current strength required and is insulated for the electrical voltage required. If the housing is a pressure housing in which a pressure deviating from an exterior pressure in an environment of the pressure housing is created, the feedthrough must also seal the pressure housing in the region of the conductor and the insulation against the pressure difference between the pressure in the pressure housing and the exterior pressure. In addition, the feedthrough must be able to withstand changes in the pressure difference.

The electrical connection of an electrical component of the electric machine to the feedthrough represents a particular challenge if this component is to be interchangeable for repair, inspection or maintenance purposes. In the case of axial conduit entry of such components into the pressure housing, no parts must protrude outwardly beyond the inner diameter of the pressure housing. As a result, the necessity arises of at least one electrical connection site between the feedthrough and the electric machine in the interior of the pressure housing or alternatively the necessity of a flexible electrical connection. Rigid electrical connections must be dimensioned such that production tolerances and movements due to thermal linear expansions are taken into account. This is problematic, above all, in the case of main supply conductors to large electric motors, since the main supply conductors are only poorly flexible. For this reason, the use of flexible connections configured as cables is attractive. However, the hollow spaces that are necessarily present between the individual wires and between the conductor and the insulation of such a cable become filled with gas which permanently diffuses through the cable covering. If the gas pressure in the interior of the pressure housing must be reduced, for example, for a repair to the electric machine or in the case of damage, the enclosed gas expands and thereby usually destroys the cable insulation. The same problem exists with process-related pressure variations. This process is known by the expression "explosive decompression".

It is an object of the invention to provide an improved feedthrough for a pressure housing and an improved machine arrangement with an electric machine arranged in a pressure housing.

SUMMARY OF THE INVENTION

The object is solved, according to the invention, with an electrical feedthrough as set forth hereinafter, a machine arrangement as set forth hereinafter, and a method for producing a machine arrangement as set forth hereinafter.

Advantageous embodiments of the invention are the subject matter of the dependent claims.

An electrical feedthrough according to the invention for a pressure housing comprises two feedthrough elements and a connecting element. The feedthrough elements each extend straight along an element axis between a first element end portion and a second element end portion and substantially match with regard to their outer form and dimensions. The connecting element is releasably connected at mutually opposite sides to a feedthrough element, in each case, the first element end portion of a feedthrough element abutting a contact area of the connecting element. Furthermore, the connecting element has at least one electrical connecting conductor, and at least one feedthrough element has an electrical feedthrough conductor for each connecting conductor, said feedthrough conductor extending along the element axis of the feedthrough element and abutting the connecting conductor in a contact area. Preferably, the element axes of both the feedthrough elements are at least approximately collinear.

A feedthrough according to the invention is provided, in particular, to enable an electrical contacting of an electric machine arranged in a pressure housing, the connecting element being arranged in the pressure housing and being connected to the electric machine, and the feedthrough element being guided through housing openings into the pressure housing. The releasable connection of the feedthrough elements to the connecting element thereby simplifies the assembly and disassembly of the feedthrough. In particular, for repair, maintenance or for exchange of the electric machine, the feedthrough elements can firstly be disassembled and subsequently the electric machine can be removed from the pressure housing without having to damage or destroy the feedthrough or the electric machine. In that the feedthrough has two feedthrough elements of substantially identical form and dimensions which are connected, at mutually opposite sides, to the connecting element, a compensation of the forces which act on the feedthrough can be achieved in the case of a pressure difference between a pressure in the housing interior of the pressure housing and a pressure in the surroundings of the pressure housing, in particular, when the feedthrough elements extend at least approximately collinearly on different sides of the connecting element. In particular, it can thereby be prevented that these forces cause a displacement of the feedthrough relative to the pressure housing, or corresponding tensions. By means of the mechanically rigid embodiment of the feedthrough, the aforementioned problem of explosive decompression, which can occur with feedthroughs with which cable connections are used, can further be avoided.

An embodiment of the invention provides at least one bracing element with which the feedthrough elements are releasably braced against the connecting element and are thereby releasably connected. For example, at least one bracing element is configured as a tensioning rod and for each tensioning rod the feedthrough has a feedthrough cutout extending through both the feedthrough elements and the connecting element, into which the tensioning rod is introduced, wherein each tensioning rod is connected to a feedthrough element with a non-positive fit. In particular, at least one feedthrough conductor can be configured as a tube through which a tensioning rod is guided.

By means of bracing elements such as a tensioning rod guided through the feedthrough elements and the connecting element, advantageously an, in particular releasable, connection of the feedthrough elements to the connecting element which is accessible outside the pressure housing can be realized. The feeding of a tensioning rod through tubular configured feedthrough conductors is particularly suitable since thereby, aside from its function for bracing the feedthrough, the tensioning rod is also used as a guide element for the feedthrough conductor.

A further embodiment of the invention provides that each feedthrough conductor is guided in an electrically insulated manner in a feedthrough element. By means of a suitably configured electrical insulation of the feedthrough conductor, not only can the electrical safety of the feedthrough be increased, but the gas tightness of the feedthrough can also be improved.

In a further embodiment of the invention, each feedthrough element that has at least one feedthrough conductor has a tubular jacket in which the at least one feedthrough conductor is guided. Thereby, each tubular jacket of a feedthrough element can have at least one tubular jacket bead which extends in an annular fashion around the element axis of the feedthrough element, the internal diameter of the cross-section of the tubular jacket being locally reduced thereby in order to increase the tightness of the feedthrough element against gas flows in the feedthrough element. By means of a tubular jacket, a feedthrough element can be effectively protected against mechanical and/or chemical impairment. For this purpose, for example, a tubular jacket made of a corrosion-resistant steel is used.

In a further embodiment of the invention, end faces of the first element end portions of the feedthrough elements and the contact areas of the connecting element are configured such that each end face abuts in surface contact against a contact area. In particular, the end faces and the contact areas can be configured such that with a surface contact of the end face with a contact area, each feedthrough element is pivotable about at least one axis perpendicular to the element axis relative to the connecting element.

By means of a surface abutment of the end face of a feedthrough element against a contact area of the connecting conductor, firstly a good electrical contact can be enabled between a feedthrough conductor of the feedthrough element and a connecting conductor of the connecting element if the end face is formed by the feedthrough conductor and the contact area is formed by the connecting conductor. Furthermore, the surface abutment can contribute to the gas tightness of the feedthrough. Due to the pivotability of the feedthrough elements with surface abutment of the end faces against the contact areas, barely avoidable production-related relatively small angular offsets of the element axes of the feedthrough elements can be compensated for during the assembly of the feedthrough.

In a further embodiment of the invention, each feedthrough element has an annular sealing element extending around the element axis, said sealing element forming a portion of the external surface of the feedthrough element. In addition, each feedthrough element can have an annular pressure sleeve extending around the element axis, said pressure sleeve abutting one end of the sealing element facing toward the second element end portion of the feedthrough element, and a pressure screw extending in an annular manner around the element axis, with which pressure screw a force deforming the sealing element can be applied to the pressure sleeve.

The sealing elements advantageously enable the sealing of openings through which feedthrough elements are guided (either through housing openings or cover openings of feedthrough covers—see below). The deformation of sealing elements by means of pressure screws via pressure sleeves enables a sealing of the openings in that the openings are closed by the deformation of the sealing elements. The sealing elements are produced, for example, from graphite. This has the advantage, in particular, that such sealing elements enable movements of the feedthrough elements in the openings, in particular, movements that can occur due to linear thermal expansion.

A further configuration of the invention provides for each feedthrough element a feedthrough cover which has a cover opening through which the feedthrough element is guided.

Feedthrough covers enable, firstly, the closing of housing openings through which the feedthrough elements are guided. Secondly, they can be used to suppress eddy currents which can be caused by the currents in the feedthrough conductors. For this purpose, the feedthrough covers are preferably produced from a non-ferromagnetic, corrosion-resistant steel.

In a further embodiment of the invention, the second element end portion of each feedthrough element that has at least one feedthrough conductor has a connection element which is configured for electrically contacting the at least one feedthrough conductor of the feedthrough element.

By means of suitable connection elements, the electrical contacting of the feedthrough can be enabled or facilitated. In particular, connection elements can be adapted to commonly used designs of electrical contacts such as plug or screw connections.

A machine arrangement according to the invention comprises a pressure housing, an electric machine arranged in the pressure housing and an electrical feedthrough according to the invention. The pressure housing has two housing openings through each of which one of the feedthrough elements of the feedthrough is guided. The connecting element is arranged in the pressure housing and at least one connecting conductor of the connecting element is electrically connected to a machine component of the electric machine.

As stated above, the use of an electrical feedthrough according to the invention into a pressure housing enables a simplified assembly and disassembly of the feedthrough and, in particular, a non-destructive removal of the electric machine, for example, for repair, maintenance or exchange thereof. Further advantages of a machine arrangement according to the invention arise from the aforementioned advantages of an electrical feedthrough according to the invention.

In a method according to the invention for producing a machine arrangement according to the invention, the connecting element of the feedthrough is arranged on the electric machine, at least one connecting conductor of the connecting element being electrically connected to a machine component of the electric machine. The electric machine and the connecting element arranged thereon are arranged in the pressure housing and subsequently, the feedthrough elements are connected to the connecting element. The method according to the invention utilizes, in particular, the releasable connectability of the feedthrough elements to the connecting element, which enables the feedthrough elements to be assembled only after the connection of the connecting element to the electric machine and the installation of the electric machine and of the connecting element in the pressure housing.

BRIEF DESCRIPTION OF THE DRAWING

The above-described properties, features and advantages of this invention and the manner in which these are achieved will now be described more clearly and intelligibly in relation to exemplary embodiments, and illustrated in detail by reference to the drawings. In the drawings.

DETAILED DESCRIPTION OF PREFERRED EMBODIMENTS

Parts which correspond to one another are provided with the same reference characters in the drawings.

Figure 1:
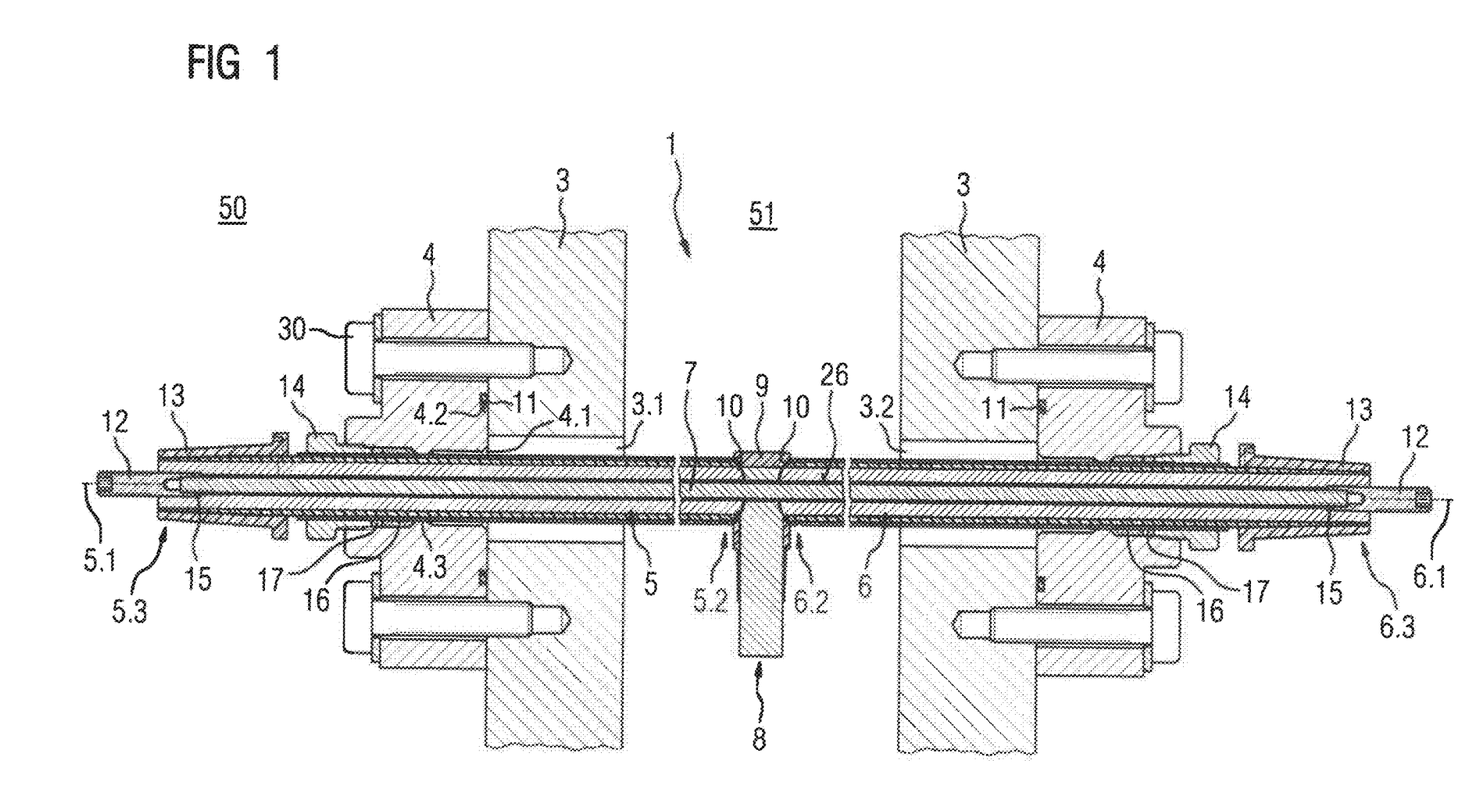
FIG. 1 shows a sectional representation of a first exemplary embodiment of an electrical feedthrough and of a pressure housing.

FIG. 1 shows a sectional representation of a first exemplary embodiment of an electrical feedthrough 1 and of a pressure housing 3. The feedthrough 1 comprises two feedthrough elements 5, 6, bracing elements 7, 12, 15, a connecting element 8 and two feedthrough covers 4. Each feedthrough element 5, 6 extends through a housing opening 3.1, 3.2 in the pressure housing 3 from a surroundings 50 of the pressure housing 3 into the housing interior 51 surrounded by the pressure housing 3 to the connecting element 8, which is arranged in the housing interior 51 between the two feedthrough elements 5, 6. The feedthrough 1 is configured, in particular, to close the housing openings 3.1, 3.2 pressure tight in order to prevent a pressure equalization between the surroundings 50 and the housing interior 51 when a different, in particular, higher pressure exists in the housing interior 51 than in the surroundings 50.

Figure 2:
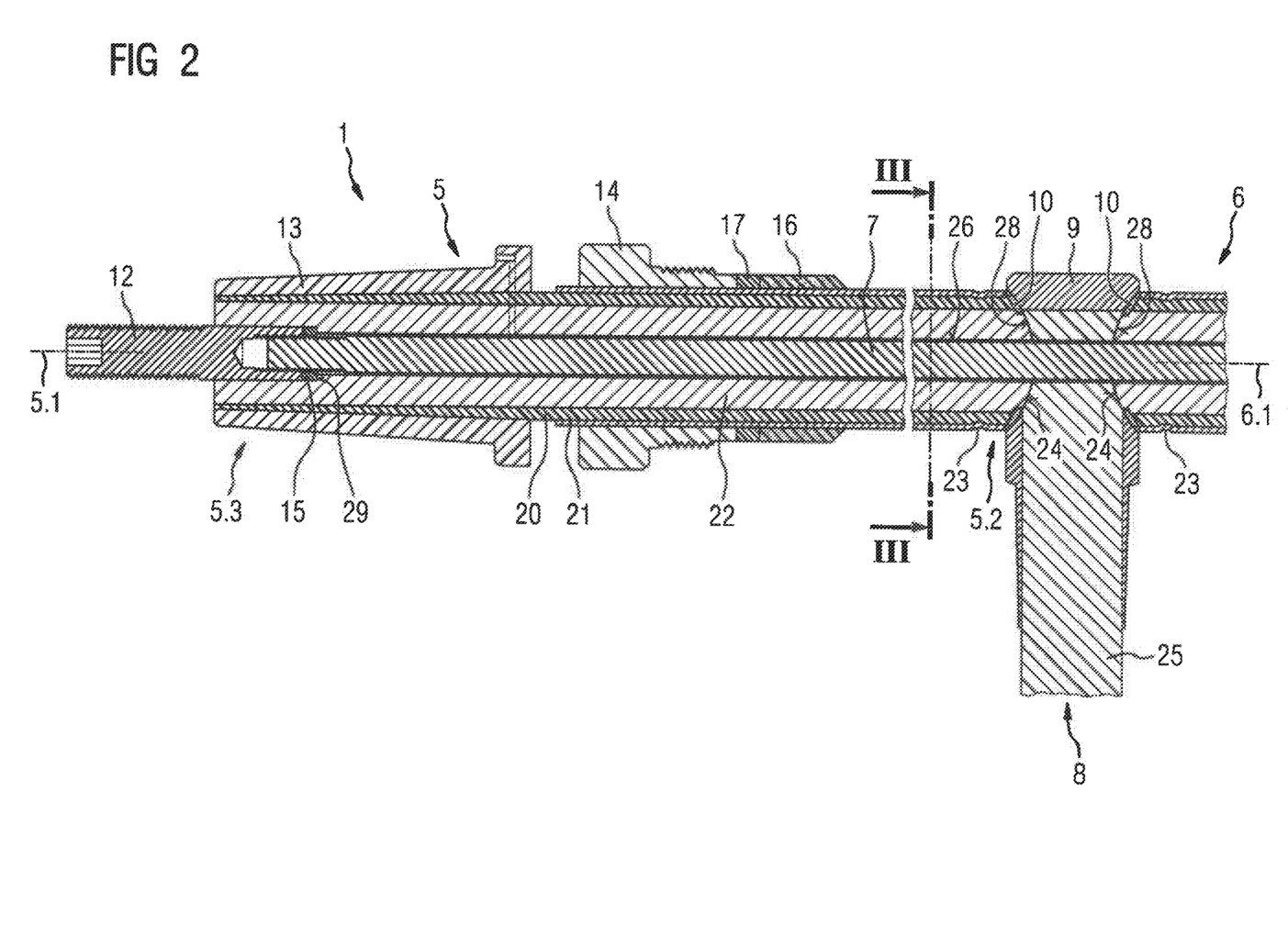
FIG. 2 shows a portion of a sectional representation of the electrical feedthrough of FIG. 1 without the feedthrough cover.

FIG. 2 shows a sectional view of the feedthrough 1 shown in FIG. 1, without the feedthrough cover 4.

Figure 3:
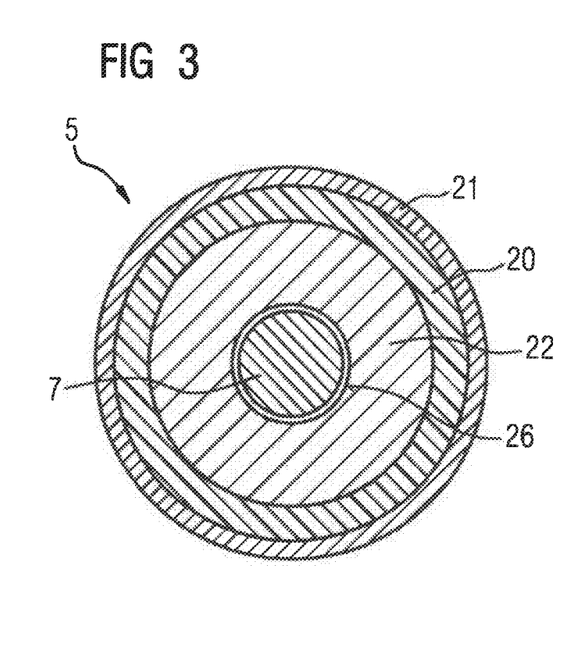
FIG. 3 shows a cross-sectional representation of a feedthrough element of the electrical feedthrough of FIG. 1.

FIG. 3 shows a cross-sectional view of the feedthrough element 5 of the feedthrough shown in FIG. 1.

The two feedthrough elements 5, 6 of the feedthrough 1 shown in FIG. 1 are identically constructed. Each feedthrough element 5, 6 extends straight along an element axis 5.1 6.1 between a first element end portion 5.2, 6.2 which abuts against the connecting element 8, and a second element end portion 5.3, 6.3 which is arranged outside the pressure housing 3. The element axes 5.1, 6.1 at least approximately coincide so that the feedthrough 1 has a T-shape. Thereby, a force compensation is achieved of the forces which, given a pressure difference between a pressure in the housing interior 51 and a pressure in the surroundings 50, act upon the feedthrough 1. In particular, it is thereby prevented that these forces cause a displacement of the feedthrough 1 relative to the pressure housing 3.

Each feedthrough element 5, 6 has an electrical feedthrough conductor 22, an insulating jacket 20 and a tubular jacket 21. The feedthrough conductor 22, the insulating jacket 20 and the tubular jacket 21 of each feedthrough element 5, 6 are designed as tubes extending concentrically around the element axis 5.1, 6.1 of the feedthrough element 5, 6 having annular cross-sections. The feedthrough conductor 22 and the insulating jacket 20 of each feedthrough element 5, 6 extend equally far from the first element end portion 5.2, 6.2 through the respective housing opening 3.1, 3.2 to the second element end portion 5.3, 6.3 of the feedthrough element 5, 6. The tubular jacket 21 of the feedthrough element 5, 6 also extends from the first element end portion 5.2, 6.2 through the housing opening 3.1, 3.2 to the second element end portion 5.3, 6.3, but has a smaller length than the feedthrough conductor 22 and the insulating jacket 20.

An internal diameter of the annular cross-section of the insulating jacket 20 of a feedthrough element 5, 6 corresponds along the course of the insulating jacket 20 to an external diameter of the annular cross-section of the feedthrough conductor 22 of the feedthrough element 5, 6, so that an internal surface of insulating jacket 20 abuts against an external surface of the feedthrough conductor 22. An internal diameter of the annular cross-section of the tubular jacket 21 of a feedthrough element 5, 6 corresponds along the course of the tubular jacket 21 to an external diameter of the annular cross-section of the insulating jacket 20 of the feedthrough element 5, 6, so that an internal surface of the tubular jacket 21 abuts against an external surface of the insulating jacket 20. Each tubular jacket 21 can have at least one tubular jacket bead 23 by means of which the internal diameter of the annular cross-section of the tubular jacket 21 is locally reduced in order to increase the tightness of the feedthrough elements 5, 6 against gas flows in the feedthrough elements 5, 6. The feedthrough conductors 22 are made of an electrically conductive material, for example, copper or aluminum. The insulating jackets 20 are made of an electrically insulating material, for example, polyether ether ketone. The tubular jackets 21 are made, for example, of a corrosion-resistant steel.

The connecting element 8 has an electrical connecting conductor 25 and an insulation 9 partially covering the connecting conductor 25. The connecting conductor 25 is made of an electrically conductive material, for example, copper or aluminum. The insulation 9 is made of an electrically insulating material, for example, polyether ether ketone.

The feedthrough 1 has a feedthrough cutout 26 extending through both the feedthrough elements 5, 6 along their element axes 5.1, 6.1 and through the connecting element 8. The feedthrough cutout 26 is bordered in the region of each feedthrough element 5, 6 by the internal surface of the feedthrough conductor 22 and is formed between the feedthrough elements 5, 6 by a cutout in the connecting element 8.

Each feedthrough element 5, 6 abuts with an end face 28 of its first element end portion 5.2, 6.2 in surface contact against one of two contact areas 24 of the connecting element 8. The end face 28 is formed by the end side of the feedthrough conductor 22 facing toward the connecting element 8. The contact areas 24 are arranged on mutually opposite sides of the connecting element 8 and are each formed by a surface portion of the connecting conductor 25 which is exposed by a recess in the insulation 9. Each contact area 24 extends in an annular manner about an end of the cutout extending through the connecting element 8 and corresponds to the end face 28 of a feedthrough element 5, 6, so that the end face 28 abuts in surface contact against the contact area 24. By means of the surface contact abutment of each end face 28 against a contact area 24, simultaneously good electrical contacts are enabled between the feedthrough conductors 22 and the connecting conductor 25 and the connections of the feedthrough elements 5, 6 with the connecting element 8 is sealed against a gas flow out of the housing interior 51 into the feedthrough cutout 26.

The end faces 28 and the contact areas 24 are also preferably configured so that each end face 28 of a feedthrough element 5, 6 can be placed on a contact area 24 so as to be pivotable about at least one axis perpendicular to the element axis 5.1, 6.1 of the feedthrough element 5, 6. For example, the end faces 28 and contact areas 24 each have the form of a spherical segment surface with a recess formed from the feedthrough cutout 26. By this means, barely avoidable production-related relatively small angular offsets between an axis of the cutout in the connecting element 8 and the element axes 5.1, 6.1 of the feedthrough elements 5, 6 while maintaining the surface contacts of the end faces 28, with a contact area 24 in each case can be compensated for. For forming the end faces 28, the feedthrough conductors 22 are soft annealed in the region of the end faces 28, for example, in a manufacturing process, in order to achieve a good plastic formability. Alternatively, for example, a separate metal seal can be used between a connecting element-side end of a feedthrough conductor 22 and a contact area 24.

Arranged between the connecting element-side end side of the insulating jacket 20 of each feedthrough element 5, 6 and the adjoining region of the insulation 9 of the connecting element 8 is an insulating seal 10 which extends in an annular manner around the feedthrough conductor 22 of the feedthrough element 5, 6. The insulating seals 10 connect the insulating jackets 20 to the insulation 9 and primarily thereby contribute to the electrical insulation of the feedthrough 1. In addition, the insulating seals 10 contribute to the sealing of the connections of the feedthrough elements 5, 6 to the connecting element 8 against a gas ingress. The insulating seals 10 can be configured separate or as integral components of the feedthrough conductors 22 or of the connecting element 8.

The bracing elements 7, 12, 15 comprise a tensioning rod 7, screw elements 12 and clamping elements 15. The tensioning rod 7 is arranged in the feedthrough cutout 26 and extends between the second element end portions 5.3, 6.3 of the two feedthrough elements 5, 6. The tensioning rod 7 has a circular cross-section which has a smaller diameter than the feedthrough cutout 26. By this means, the tensioning rod 7 can be arranged in the feedthrough cutout 26, even with relatively small angular offsets between the axis of the cutout in the connecting element 8 and the element axes 5.1, 6.1 of the feedthrough elements 5, 6. The tensioning rod 7 is made, for example, of a steel.

Each end portion of the tensioning rod 7 has an external thread in order to screw the end portion to a screw element 12. The screw elements 12 each have a cutout with an internal thread which corresponds to an external thread of the tensioning rod 7. Each clamping element 15 extends in an annular manner around the tensioning rod 7 in the region of an end portion of the tensioning rod 7 and is pressed, through the screwing of a screw element 12 onto the end portion of the tensioning rod 7, by the screw element 12 against a stop face 29 which is formed in the internal surface of a feedthrough conductor 22 in an annular manner around the respective element axis 5.1, 6.1 and which is arranged perpendicularly to the element axis 5.1, 6.1. Between the stop face 29 and the end of a feedthrough conductor 22 facing away from the connecting element 8, the annular cross-section of the feedthrough conductor 22 has a larger internal diameter than between the stop face 29 and the connecting element 8 in order to enable the introduction of a screw element 12 into the feedthrough conductor 22.

Through the pressing of each of the clamping elements 15 against the stop face 29 of a feedthrough conductor 22 when screwing each end portion of the tensioning rod 7 onto a screw element 12, the feedthrough conductors 22 are connected to the tensioning rod 7 with a non-positive fit. By this means, the feedthrough elements 5, 6 are braced against the connecting element 8 and, in particular, the end faces 28 of the feedthrough conductors 22 are each pressed against a contact area 24 of the connecting element 8. The screw elements 12 thus realize a releasable connection of the feedthrough elements 5, 6 to the connecting element 8 via the tensioning rod 7, so that the assembly and disassembly of the feedthrough 1 are facilitated.

Each feedthrough cover 4 has a cover opening 4.1 through which a feedthrough element 5, 6 is guided, and closes a housing opening 3.1, 3.2. The feedthrough covers 4 are each fastened by screws 30 on an exterior side of the pressure housing 3. An external surface of each feedthrough cover 4 abutting the pressure housing 3 has an annular depression 4.2 extending around the cover opening 4.1 in which depression a sealing ring 11 is arranged in order to seal the connection of the external surface of the feedthrough cover 4 to the pressure housing 3. The feedthrough covers 4 are, for example, produced from a non-ferromagnetic, corrosion-resistant steel. A non-ferromagnetic material is advantageous in order largely to avoid eddy currents in the feedthrough covers 4. The use of a corrosion-resistant steel advantageously reduces the impairment of the feedthrough cover 4 by corrosion.

In order to seal a cover opening 4.1 around a feedthrough element 5, 6, the feedthrough element 5, 6 has a sealing element 16, a pressure sleeve 17 and a pressure screw 14 which are arranged one behind the other on the external surface of the tubular jacket 21 and extend in an annular manner around the element axis 5.1, 6.1 of the feedthrough element 5, 6. The sealing element 16 is plastically deformable. The sealing element 16 is arranged in the cover opening 4.1, the pressure sleeve 17 is arranged between the sealing element 16 and the pressure screw 14 and the pressure screw 14 protrudes out of the cover opening 4.1 toward the second element end portion 5.3, 6.3 of the feedthrough element 5, 6. The cover opening 4.1 has an opening constriction 4.3 bordering on the sealing element 16, at which a diameter of the cover opening 4.1 reduces to the external diameter of the annular cross-section of the tubular jacket 21 and delimits a displacement and deformation of the sealing element 16. The pressure screw 14 can be screwed into the pressure housing 3. Through the screwing-in, a force is exerted with the pressure screw 14 onto the pressure sleeve 17, acting via the pressure sleeve 17 on the sealing element 16 and deforming it until the sealing element 16 completely fills a sealing chamber delimited by the opening constriction 4.3 and the pressure sleeve 17.

The sealing elements 16 are produced, for example, from graphite. This advantageously enables, in particular, movements of the feedthrough elements 5, 6 that can occur due to linear thermal expansions.

The second element end portion 5.3, 6.3 of each feedthrough element 5, 6 has a connection element 13 which is configured for electrically contacting the feedthrough conductor 22 of the feedthrough element 5, 6. The connection elements 13 shown in FIGS. 1 and 2 are each designed as an insulating body extending in an annular manner around the insulating jacket 20 of the feedthrough element 5, 6 which narrows conically toward the end of the insulating jacket 20 (the tubular jacket 21 of each feedthrough element 5, 6 ends between the connection element 13 and the pressure screw 14 of the feedthrough element 5, 6). For example, the insulating body has dimensions in accordance with the standard DIN 50180-1. Alternatively, however, other connection elements 13 can be used, for example, connection elements 13 configured as plug-in elements.

Figure 4:
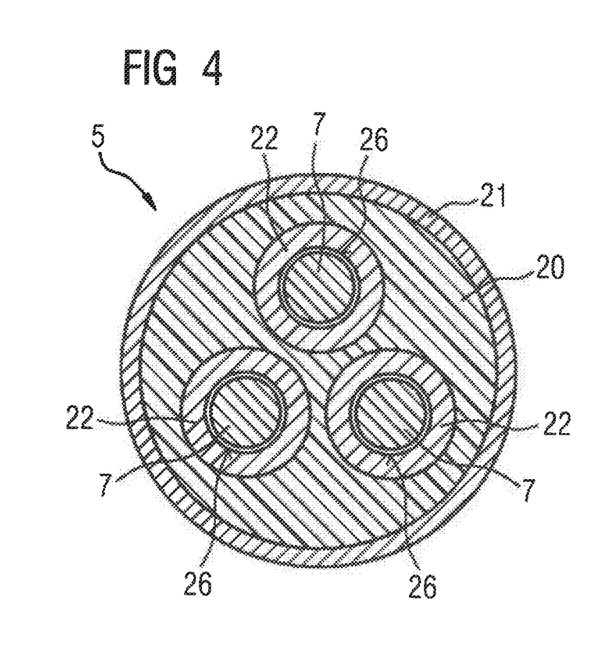
FIG. 4 shows a cross-sectional representation of a feedthrough element of a second exemplary embodiment of an electrical feedthrough.

FIG. 4 shows a cross-sectional view of a feedthrough element 5 of a second exemplary embodiment of a feedthrough 1. This exemplary embodiment differs from the exemplary embodiment shown in FIGS. 1 to 3 in that each feedthrough element 5, 6 has three feedthrough conductors 22 which are guided through a common insulating jacket 20 and are each constructed as a tube with an annular cross-section. Accordingly, the connecting element 8 has three connecting conductors 25 which are electrically insulated relative to one another and are each connected to a feedthrough conductor 22 of each feedthrough element 5, 6. Furthermore, the feedthrough 1 has three tensioning rods 7 and three feedthrough cutouts 26, which each extend through a tubular feedthrough conductor 22 of each feedthrough element 5, 6.

The exemplary embodiments of a feedthrough according to the invention described by reference to FIGS. 1 to 4 can be amended in various ways to further exemplary embodiments. For example, in the exemplary embodiment described by reference to FIG. 4, rather than three tensioning rods 7, each extending through a tubular feedthrough conductor 22 of each feedthrough element 5, 6, just one tensioning rod 7 can be provided which extends either through a tubular feedthrough conductor 22 of each feedthrough element 5, 6 or through the insulating jackets 20 of the two feedthrough elements 5, 6 (in the latter case, the feedthrough conductors 22 can be constructed as solid rather than as tubes and the tensioning rod 7 can be guided centrally between the feedthrough conductors 22 through the insulating jacket 20 of each feedthrough element 5, 6). The exemplary embodiment described by reference to FIGS. 1 to 3 can also be amended such that the tensioning rod 7 is not guided through the feedthrough conductors 22 but through the insulating jackets 20 of the feedthrough elements 5, 6 (in this case also, the feedthrough conductors 22 can be constructed as solid rather than as tubes). It can further be provided that a common feedthrough cover 4 and a common housing opening 3.1, 3.2 for a plurality of feedthrough elements 5, 6 are provided (in this case, a feedthrough cover 4 has a plurality of cover openings 4.1, each for one feedthrough element 5, 6).

All the previously mentioned exemplary embodiments can be further developed so that no feedthrough covers 4 are provided, but that each housing opening 3.1, 3.2 is closed and sealed directly around the feedthrough element 5, 6, for example, in each case with a sealing element 16, a pressure sleeve 17 and a pressure screw 14 similarly to the cover openings 4.1 in accordance with FIGS. 1 and 2. This can be useful, in particular, if the pressure housing 3 is made from a non-ferromagnetic material.

It can furthermore be provided that only one of the two feedthrough elements 5, 6 is configured to be electrically contacted. In this case, the other feedthrough element 5, 6 need have, for example, no connection element 13. It can even be provided that the other feedthrough element 5, 6 has no feedthrough conductor 22 and accordingly also no insulating jacket 20, whereby, however, the external shape and the external dimensions of the two feedthrough elements 5, 6 then also substantially match in order to enable the aforementioned force compensation.

Figure 5:
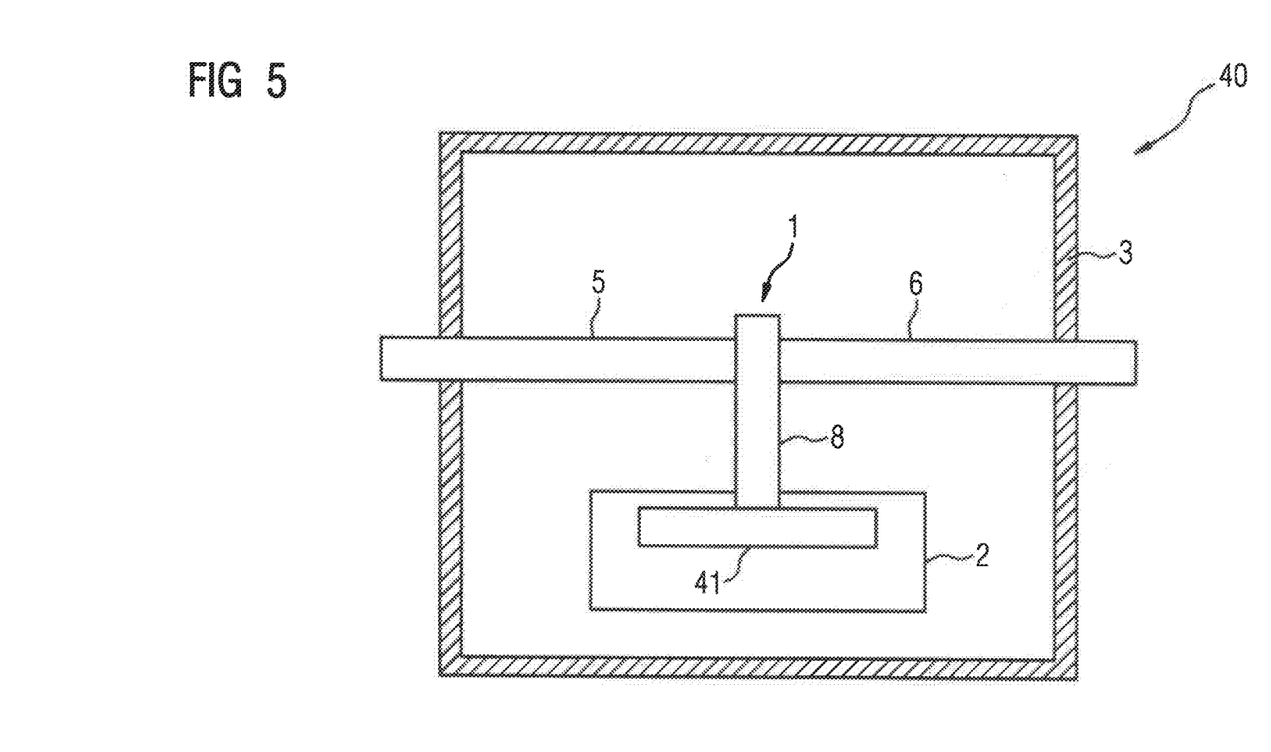
FIG. 5 shows a schematic sectional representation of a machine arrangement with a pressure housing, an electric machine and an electrical feedthrough.

FIG. 5 shows schematically a sectional representation of an exemplary embodiment of a machine arrangement 40 according to the invention. The machine arrangement 40 comprises a pressure housing 3, an electric machine 2 arranged in the pressure housing 3 and an electrical feedthrough 1 as provided in FIGS. 1 to 3. The feedthrough elements 5, 6 of the feedthrough 1 are each guided through a respective housing opening 3.1, 3.2 and are connected to the connecting element 8 of the feedthrough 1. The connecting conductor 25 of the connecting element 8 is electrically connected to a machine component 41 of the electric machine 2. The electric machine 2 is an electric motor, generator or transformer. The machine component 41 is, for example, a machine winding of the electric machine 2, for example, a stator winding or a rotor winding in the case that the electric machine 2 is an electric motor or generator, or a primary or secondary winding in the case that the electric machine 2 is a transformer.

In the production of the machine arrangement 40, firstly the connecting element 8 of the feedthrough 1 is arranged on the electric machine 2. Therein, the connecting conductor 25 of the connecting element 8 is electrically connected, for example by hard soldering, to the machine component 41 and subsequently an insulation system of the electric machine 2 is connected to the insulation 9 of the connecting element 8, for example, by winding with mica tape and subsequent impregnation with a synthetic resin in a Vacuum Pressure Impregnation (VPI) method. Thereafter, the electric machine 2 and the connecting element 8 arranged thereon are arranged in the pressure housing 3. Subsequently, the feedthrough elements 5, 6 are connected by means of the bracing elements 7, 12, 15 to the connecting element 8. For repair, maintenance or for exchange of the electric machine 2, the feedthrough elements 5, 6 can firstly be disassembled and then the electric machine 2 can be removed from the pressure housing 3.

Although the invention has been illustrated and described in detail on the basis of preferred exemplary embodiments, the invention is not restricted by the examples given and other variations can be derived therefrom by a person skilled in the art without departing from the protective scope of the invention.

What is claimed is:

1. An electrical feedthrough for a pressure housing, said electrical feedthrough comprising:

first and second feedthrough elements having substantially matching external shape and dimension, each of the feedthrough elements extending straight along an element axis between a first element end portion and a second element end portion; and a connecting element releasably connected to the feedthrough elements and having opposite sides, with a first of the opposite sides having a first contact area upon which the first element end portion of the first feedthrough element abuts, and with a second of the opposite sides having a second contact area upon which the first element end portion of of the second feedthrough element abuts, said connecting element including an electrical connecting conductor, a first bracing element configured as a tensioning rod received in a feedthrough cutout which extends through each of the feedthrough elements and the connecting element, said tensioning rod being connected to each feedthrough element with a non-positive fit, wherein at least one of the feedthrough elements includes an electrical feedthrough conductor which extends along the element axis thereof and abuts the connecting conductor.

2. The feedthrough of claim 1, wherein the element axis of each of the feedthrough elements extend approximately collinear to one another.

3. The feedthrough of claim 1, further comprising a second bracing element releasably bracing the feedthrough elements against the connecting element so as to releasably connect the feedthrough elements to the connecting element.

4. The feedthrough of claim 1, wherein the feedthrough conductor is configured as a tube for passage of the tensioning rod.

5. The feedthrough of claim 1, wherein the feedthrough conductor is guided electrically insulated in said at least one of the feedthrough elements.

6. The feedthrough of claim 1, wherein each of the feedthrough elements includes a tubular jacket in which the feedthrough conductor is guided.

7. The feedthrough of claim 1, further comprising feedthrough covers respectively provided for the feedthrough elements, said feedthrough covers including each a cover opening for passage of the feedthrough elements.

8. The feedthrough of claim 1, wherein the second element end portion of each of the feedthrough elements includes a connection element configured to electrically contact the feedthrough conductor of said at least one of the feedthrough elements.

9. The feedthrough of claim 1, wherein the first element end portions of the feedthrough elements have end faces configured to abut the contact areas of the connecting element with surface contact.

10. The feedthrough of claim 9, wherein the end faces of the first element end portions of the feedthrough elements and the contact areas of the connecting element are configured such that the feedthrough elements are olvotable relative to the connecting element about an axis perpendicular to the element axis.

11. The feedthrough of claim 1, wherein each of the feedthrough elements includes an annular sealing element extending around the element axis, said sealing element forming a portion of an external surface of each feedthrough element.

12. The feedthrough of claim 11, wherein each of the feedthrough elements includes an annular pressure sleeve extending around the element axis, said pressure sleeve abutting one end of the sealing element in facing relation toward the second element end portion of the feedthrough element, and a pressure screw which extends in an annular manner around the element axis and with which a force can be applied to the pressure sleeve for deforming the sealing element.

13. A machine arrangement, comprising:
the electrical feedthrough of claim 1;
a pressure housing having two housing openings for passage of the feedthrough elements of the electric feedthrough, respectively, said connecting element of the electric feedthrough being arranged in the pressure housing; and
an electric machine arranged in the pressure housing and including a machine component which is electrically connected to the connecting conductor of the connecting element.

14. A method for producing the machine arrangement of claim 13, said method comprising:
arranging a connecting element of an electric feedthrough on an electric machine of the machine arrangement such that a connecting conductor of the connecting element is electrically connected to a machine component of the electric machine;
arranging the electric machine and the connecting element on the electric machine in a pressure housing; guiding feedthrough elements of the electric feedthrough through housing openings of the pressure housing; and
connecting the feedthrough elements to the connecting element.

* * * * *

UNITED STATES PATENT AND TRADEMARK OFFICE
CERTIFICATE OF CORRECTION

| | | |
|---|---|---|
| PATENT NO. | : 12,021,363 B2 | Page 1 of 1 |
| APPLICATION NO. | : 17/432409 | |
| DATED | : June 25, 2024 | |
| INVENTOR(S) | : Matthias Johannes Burghard et al. | |

It is certified that error appears in the above-identified patent and that said Letters Patent is hereby corrected as shown below:

On the Title Page

Item (87) PCT Publ No.: replace "WO2020/169232" with --WO2020/169238--;

In the Claims

In Column 10, Claim 1, Line 60: correct "end portion of of the second feedthrough" to read --end portion of the second feedthrough--;
In Column 11, Claim 10, Line 37: replace "olvotable" with --pivotable--.

Signed and Sealed this
Thirtieth Day of July, 2024

Katherine Kelly Vidal
*Director of the United States Patent and Trademark Office*